U.S. Patent Number: 5,897,182
Date of Patent: Apr. 27, 1999

Miyawaki

[54] SUBSTRATE FOR A LIQUID CRYSTAL DISPLAY DEVICE AND LIQUID CRYSTAL DISPLAY DEVICE HAVING THE SAME

[75] Inventor: Mamoru Miyawaki, Isehara, Japan

[73] Assignee: Canon Kabushiki Kaisha, Tokyo, Japan

[21] Appl. No.: 08/900,292

[22] Filed: Jul. 25, 1997

Related U.S. Application Data

[63] Continuation of application No. 08/578,388, Dec. 28, 1995, abandoned, which is a continuation of application No. 08/200,529, Feb. 23, 1994, abandoned.

[30] Foreign Application Priority Data

Feb. 26, 1993 [JP] Japan .................................. 5-061388
Feb. 26, 1993 [JP] Japan .................................. 5-061389
Feb. 7, 1994 [JP] Japan .................................. 6-033274

[51] Int. Cl.⁶ .............................. G02F 1/333; G02F 1/136
[52] U.S. Cl. .................................. 349/43; 349/40; 349/42; 349/46; 345/93
[58] Field of Search .................................. 359/59, 87, 75, 359/79; 349/40, 42, 43, 46; 345/93

[56] References Cited

U.S. PATENT DOCUMENTS

Re. 33,882  4/1992  Morozumi .................................. 359/68
4,568,149  2/1986  Sugata et al. .............................. 359/59
4,917,467  4/1990  Chen et al. ................................ 349/46
5,028,122  7/1991  Hamada et al. ........................... 359/59
5,062,690  11/1991  Whetten .................................... 359/59
5,075,674  12/1991  Katayama et al. ....................... 359/59
5,237,436  8/1993  Khan et al. ................................ 359/59
5,327,268  7/1994  Takabatake et al. ..................... 349/38
5,414,283  5/1995  Den Boer et al. ........................ 349/46

Primary Examiner—William L. Sikes
Assistant Examiner—Julie Ngo
Attorney, Agent, or Firm—Fitzpatrick, Cella, Harper & Scinto

[57] ABSTRACT

In a TFT substrate for a liquid crystal display and the liquid crystal display having such a TFT substrate, a defect in the wiring due to improper patterning of a gate electrode is prevented and an orientation property is improved by connecting wiring areas to a scan line and connecting a gate electrode to the scan line at two points, and the connecting wiring areas are formed in a ring shape so that a source electrode is located in an area surrounded by the connecting wiring areas, or arranging the wiring area to relieve a step.

36 Claims, 16 Drawing Sheets 5,897,182

SUBSTRATE FOR A LIQUID CRYSTAL DISPLAY DEVICE AND LIQUID CRYSTAL DISPLAY DEVICE HAVING THE SAME

This application is a continuation of application Ser. No. 08/578,388, filed Dec. 28, 1995, now abandoned, which is, in turn, a continuation of application Ser. No. 08/200,529, filed Feb. 23, 1994, now abandoned.

BACKGROUND OF THE INVENTION

1. Field of the Invention

The present invention relates to a substrate for a liquid crystal display device and the liquid crystal display device having the same, and more particularly to a substrate for a liquid crystal display device and a liquid crystal display device having the same which are suitably used in displaying an image of a high resolution such as a television image.

2. Related Background Art

A simple matrix type liquid crystal device having a pair of substrates, each having stripe electrodes, arranged to face each other with the electrode thereof crossing, is sufficient for displaying simple time or a simple image but there is a limit in time division drive and the number of pixels required increases in displaying an image which requires a high resolution and a high grade such as a television image and it is not possible to control it by the time division drive. Recently, an active matrix system has been developed to take place of the simple matrix system.

In an active matrix type liquid crystal drive device, a common electrode is provided on one of the substrates and a pixel electrode for each pixels is provided on the other substrate, and a thin film transistor (TFT) is arranged as a switching device for each pixel electrode. The TFT comprises two main electrodes called a source electrode and a drain electrode, and a control electrode called a gate electrode. In the active matrix system, one of the main electrodes is usually connected to a signal line, the other main electrode is connected to the pixel electrode, and the gate electrode is connected to a scan line. Which one of the main electrodes is to be used as the source electrode may vary depending on a type of the transistor and an applied voltage. In the present specification, an electrode closer to a display signal line is defined as a source electrode, and an electrode closer to the pixel electrode is defined as a drain electrode.

FIG. 1 shows an example of a TFT substrate of an active matrix type liquid crystal display device. In FIG. 1, numeral 2 denotes a scan line, numeral 3 denotes a signal line, numeral 4 denotes a pixel electrode, and numeral 10 denotes a TFT. As shown in FIG. 1, the scan lines 2 and the signal lines 3 are arranged in matrix and an operation of the TFT 10 provided for each pixel to control the application of a voltage to the pixel electrode 4 to attain a desired display.

FIGS. 2A to 2C show a TFT 10 and its periphery. In FIGS. 2A to 2C, numeral 1 denotes a gate electrode, numeral 6 denotes a semiconductor layer, numeral 7 denotes a source electrode, numeral 8 denotes a drain electrode, numerals 9-1 to 9-3 denote interlayer insulating layers, and numerals 2 to 4 denote the same as those of FIG. 1. FIG. 2B shows a B–B' sectional view of FIG. 2A and 2C shows a C–C' sectional view of FIG. 2A. In FIG. 2A and FIG. 2C, the interlayer insulating layer 9 is omitted for the purpose of simplification.

As shown in FIGS. 2A to 2C, the gate electrode 1 is formed on the semiconductor layer 6 which is formed on the insulating transparent substrate, through the interlayer insulating layer 9-1. The interlayer insulating layer 9-2 is formed thereon and a contact hole is formed in the interlayer insulating layer 9-2 to form the source electrode 7 and the drain electrode 8. Polycrystalline or amorphous Si, or single crystal Si is normally used as a material for the semiconductor layer 6, and poly-Si or a metal such as Al, Cr or Ta which may be easily filmed is used as a material for the gate electrode 1 and the scan line 2. The source electrode 7 and the signal line 3 are made of a metal such as Al, and the pixel electrode 4 is made of transparent indium tin oxide (ITO).

Since the required layers are arranged in overlapping or crossing manner in the periphery of the TFT, there is a step in a section as shown in FIG. 2B and FIG. 2C, and the layers coated on the step are easily broken.

Particularly in the gate electrode 1 extending from the scan signal line 2, a defect easily occurs in patterning by the semiconductor layer 6 in the step area, and this is one factor to reduce a yield of the TFT substrate. Further, as a pixel size increases, the length of the scan line increases and a resistance increases so that a sufficiently large pulse cannot be applied.

SUMMARY OF THE INVENTION

It is an object of the present invention, in the light of the above problems, to assure the connection of a gate electrode and a scan signal line, enhance a manufacturing yield of a TFT substrate and reduce a resistance of a scan line to allow a large pixel display.

It is another object of the present invention to provide a liquid crystal display device having an improved orientation controllability of an orientation control film.

It is other object of the present invention to provide a TFT substrate comprising:

a support;

a plurality of transistors each having a semiconductor layer, at least two main electrodes and a gate electrode;

pixel electrodes provided one for each of the transistors and connected to one of the main electrodes;

signal lines connected to the other of the main electrodes;

scan lines connected to the gate electrodes;

and wiring areas connected to the scan lines.

It is other object of the present invention to provide a liquid crystal display device comprising:

a TFT substrate including a support, a plurality of transistors each having a semiconductor layer, at least two main electrodes and a gate electrode, pixel electrodes provided one for each of the transistors and connected to one of the main electrodes, signal lines connected to the other of the main electrodes, scan lines connected to the gate electrodes, and wiring lines connected to the scan lines;

an opposing substrate including a second support and a common electrode formed on the second support; and liquid crystal arranged between the TFT substrate and the opposing substrate.

It is a further object of the present invention to provide a TFT substrate for an active matrix type liquid crystal display device holding liquid crystal between a common substrate and a second TFT substrate, the second TFT substrate comprising:

a plurality of pixel electrodes;

transistors provided one for each of the pixel electrodes;

signal lines connected to first main electrodes of the transistors;

the pixel electrodes being connected to second main electrodes of the transistors; and scan lines connected to control electrodes of the transistors;

wherein the scan lines have a ring-shaped structure to surround connecting areas of the main electrodes and the signal lines, and a liquid crystal display device having the above TFT substrate.

It is a still further object of the present invention to provide a TFT substrate for an active matrix type liquid crystal display device holding liquid crystal between a common substrate and a second TFT substrate, the second TFT substrate comprising:

a plurality of pixel electrodes;

transistors provided one for each of the pixel electrodes;

signal lines connected to first main electrodes of the transistors;

the pixel electrodes being connected to second main electrodes of the transistors; and scan lines connected to control electrodes of the transistors;

wherein wiring areas parallel or perpendicular to the control electrodes are formed in the scan lines or to project from the scan lines, and a liquid crystal display device having the above TFT substrate.

DETAILED DESCRIPTION OF THE PREFERRED EMBODIMENTS (Embodiment 1)

Figure 2A:
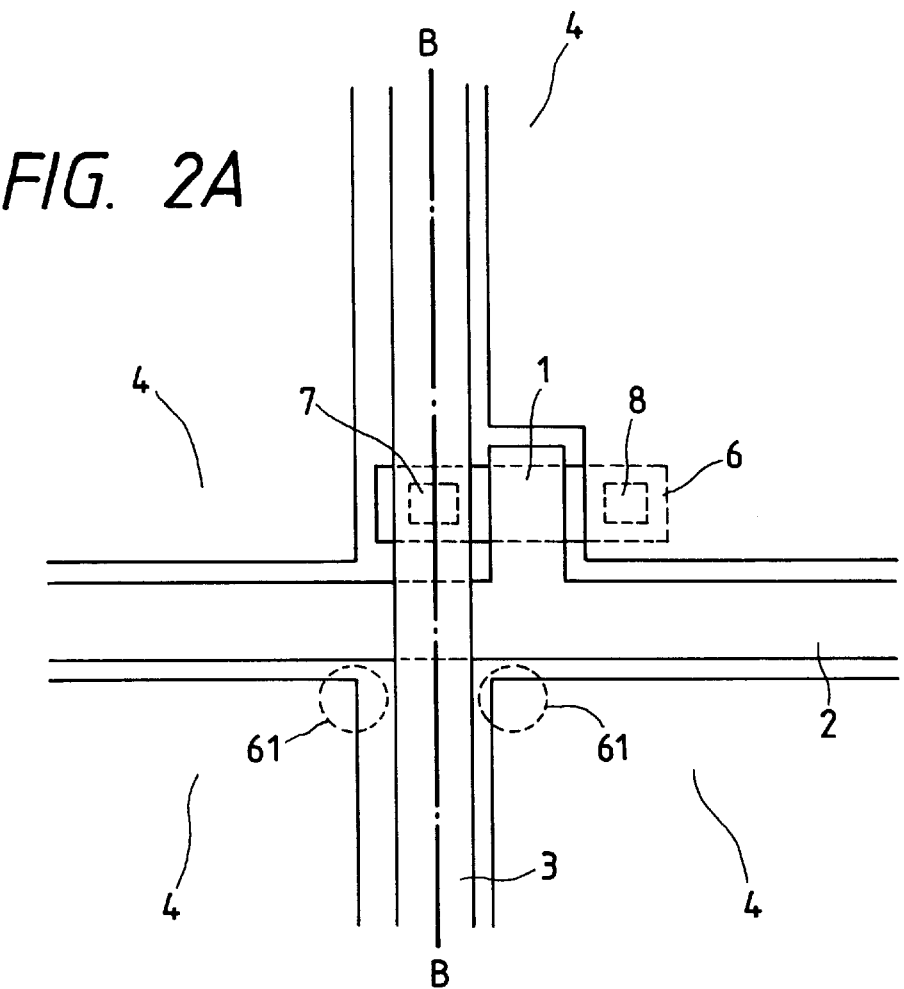
FIGS. 2A to 4B, FIGS. 6 to 16 and FIGS. 18 to 20 show embodiments of a wiring structure of a TFT substrate.
Figure 2B:
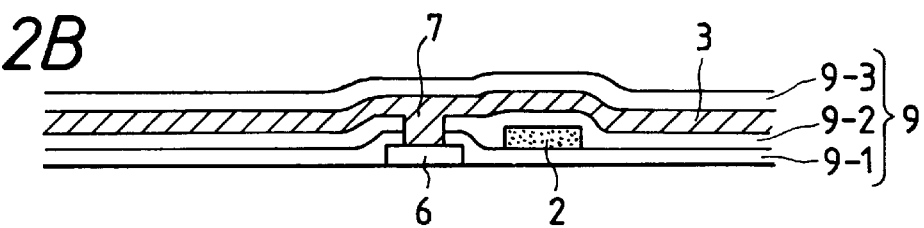
Figure 2C:
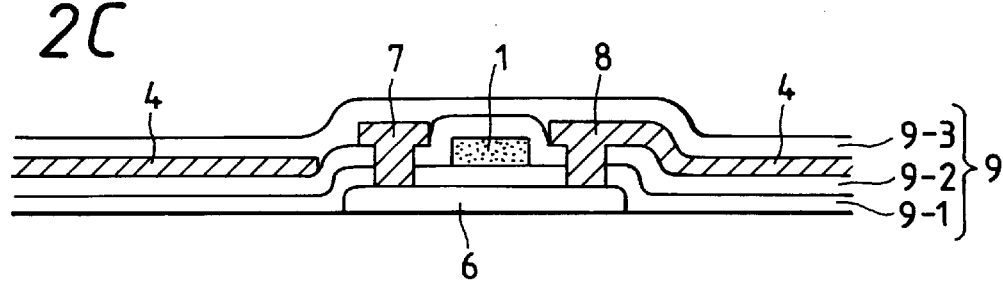
Figure 3A:
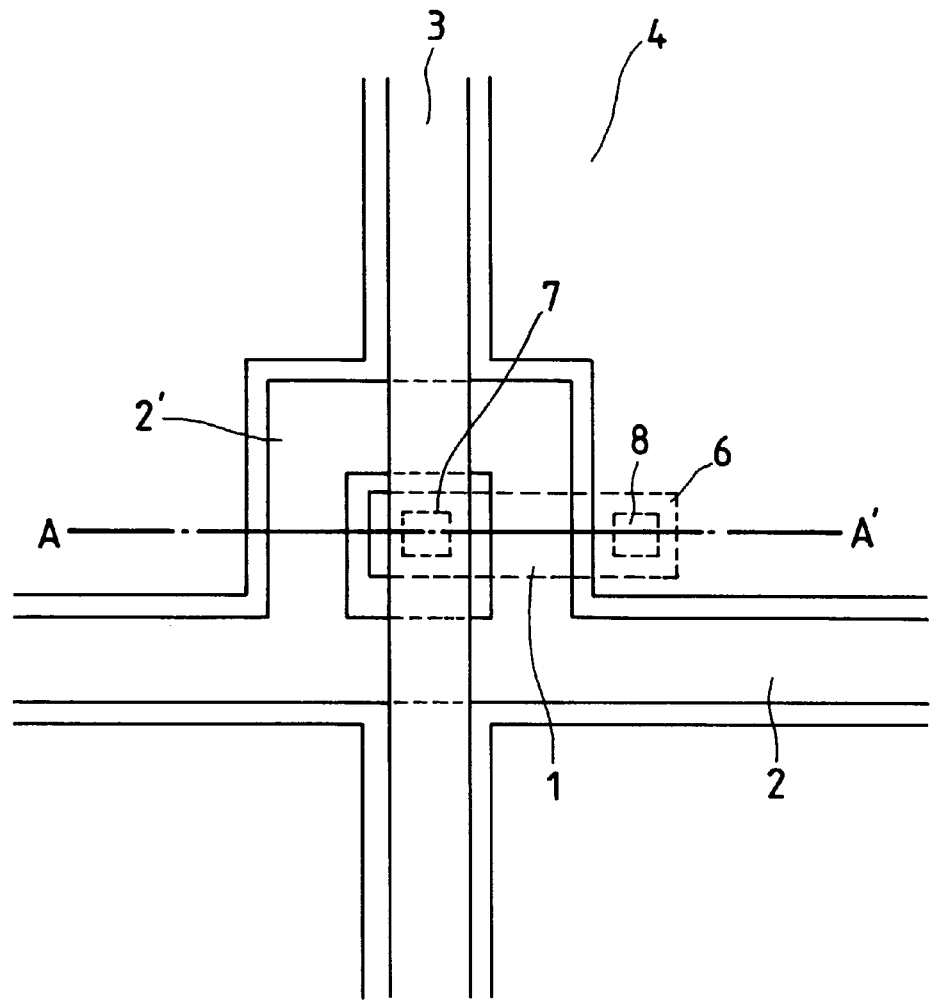
Figure 3B:
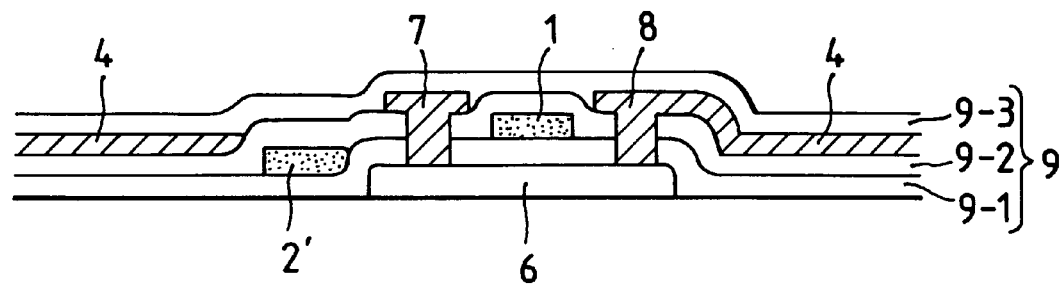

FIGS. 3A and 3B show an embodiment of the present invention. The numerals used therein are identical to those of FIGS. 1 and 2A to 2C. FIG. 3A shows a schematic plan view and FIG. 3B shows a schematic A–A' sectional view of FIG. 3A. In FIG. 3A, the interlayer insulating layer 9 is omitted.

In the present embodiment, the scan signal line 2 and the gate electrode 1 are made of poly-Si or a metal such as Al, Mo or Ta, and the TFT semiconductor layer is made of poly-Si grown by a reduced pressure CVD at 60° C. or grown from a-Si, or single crystal Si. As single crystal Si, the single crystal Si on an SOI substrate which is formed by epitaxial growth on a poly-Si, bonding to an insulating layer and removal of a porous layer has substantially no defect and provides an excellent semiconductor device characteristic and it may be suitably used in the present invention. The signal line 3 is made of Al or an alloy such as Al-Si or Al-Si-Cu.

As shown in FIG. 3A, in the present embodiment, wiring 2' which extends from the scan line 2 to surround the source electrode and a gate electrode 1 are formed. Namely, the wiring 2' and the gate electrode 1 are electrically connected, and the wiring 2' and the gate electrode 1 are electrically connected to the scan line 2. As a result, a ring-shaped wiring area formed by the scan electrode 2, the wiring 2' and the gate electrode 1 is formed around the source electrode 7. In other words, the gate electrode 1 extends over the wiring 2' in one area and is connected to the scan line at two points.

As shown in FIGS. 3A and 3B, in the present invention, since the gate electrode 1 and the scan signal line 2 are connected at two points by the wiring 2' which surrounds the source electrode 7, even if a defect in patterning occurs in one wiring point, the electrical connection is assured by the other wiring. Further, since the step in the periphery of the source electrode 7 is relieved by the ring-shaped wiring 2', misorientation of the liquid crystal due to the step is avoided and the display image quality is improved.

Further, since a line similar to a bypass line is formed by the wiring 2' and the gate electrode 1, the resistance of the scan line is reduced to approximately ¾ and a liquid crystal display device having pixels at a high density such as 300,000 pixels per 0.7 inch is attained. While a mesa TFT is shown in the present embodiment, this is not restrictive and a LOCOS separated TFT may be used. Similarly, the LOCOS separated may also be used in other embodiments to be described later.

A schematic sectional view of a liquid crystal display device manufactured by using the TFT substrate described above is shown in FIG. 17.

Figure 17:
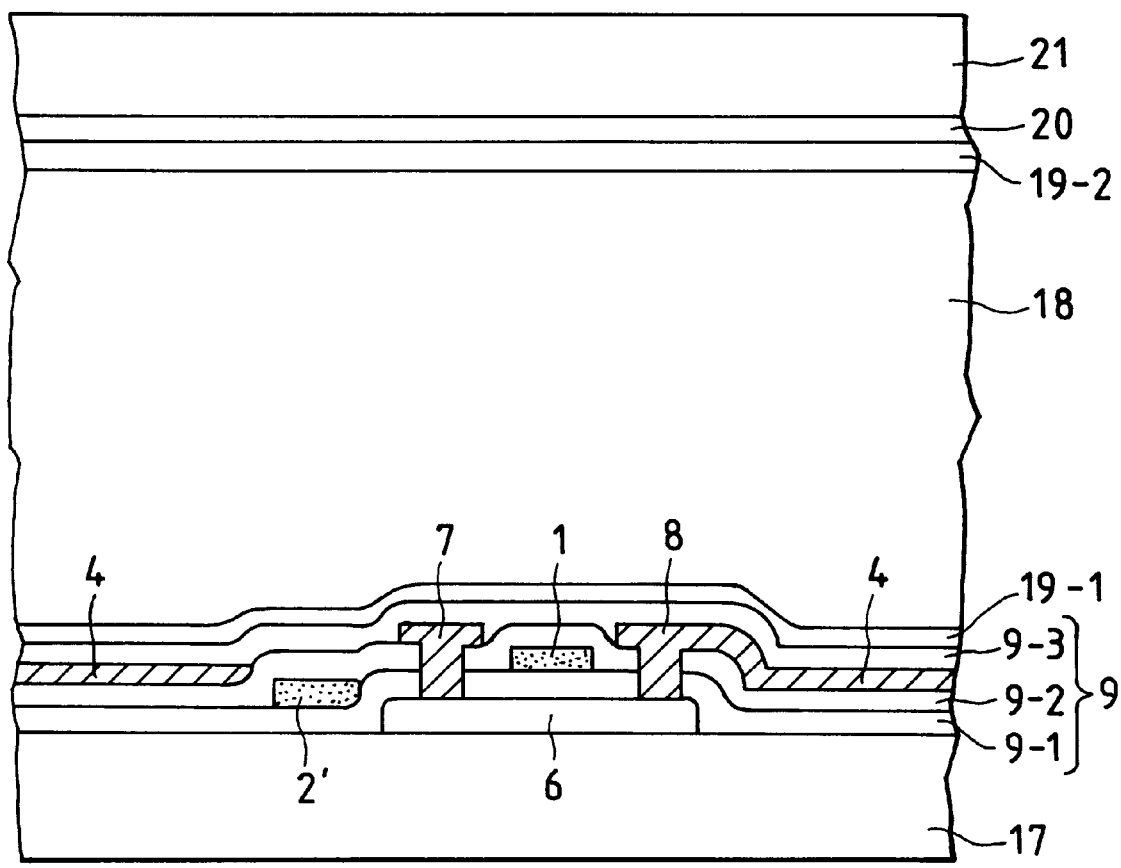
FIG. 17 shows an embodiment of a liquid crystal display device having the TFT substrate of the present invention.

FIG. 17 shows a liquid crystal display device having a TFT substrate comprising the layered structure as shown in FIGS. 2A to 2C and an orientation film 19-1 formed on a support 17. Numeral 18 denotes a liquid crystal layer, numeral 19-2 denotes an orientation film arranged on a common electrode 20 formed by a transparent conductive layer as represented by an oxide containing indium or tin such as ITO, formed on a support 21 of an opposing substrate.

As the orientation film, polyimid, polyamide or $SiO_2$ may be suitably used. A desired orientation property of the orientation film may be imparted by obliquely vapor depositing an inorganic insulating material such as $SiO_2$. Alternatively, a high molecular material such as polyimid or polyamide may be applied and the surface thereof may be rubbed to attain a desired orientation property.

The rubbing of polyimid or polyamide to form the orientation film (orientation control film) is easier to manufacture and easier to tailor the orientation property.

The orientation film 10-1 may be provided in place of the interlayer insulating layer 9-3.

In the TFT substrate manufactured in the embodiments to be described below, a liquid crystal display device may be formed by holding the liquid crystal layer between the common electrode and the opposing substrate.

In this case, an orientation film is properly formed as required.

(Embodiment 2)

Figure 4A:
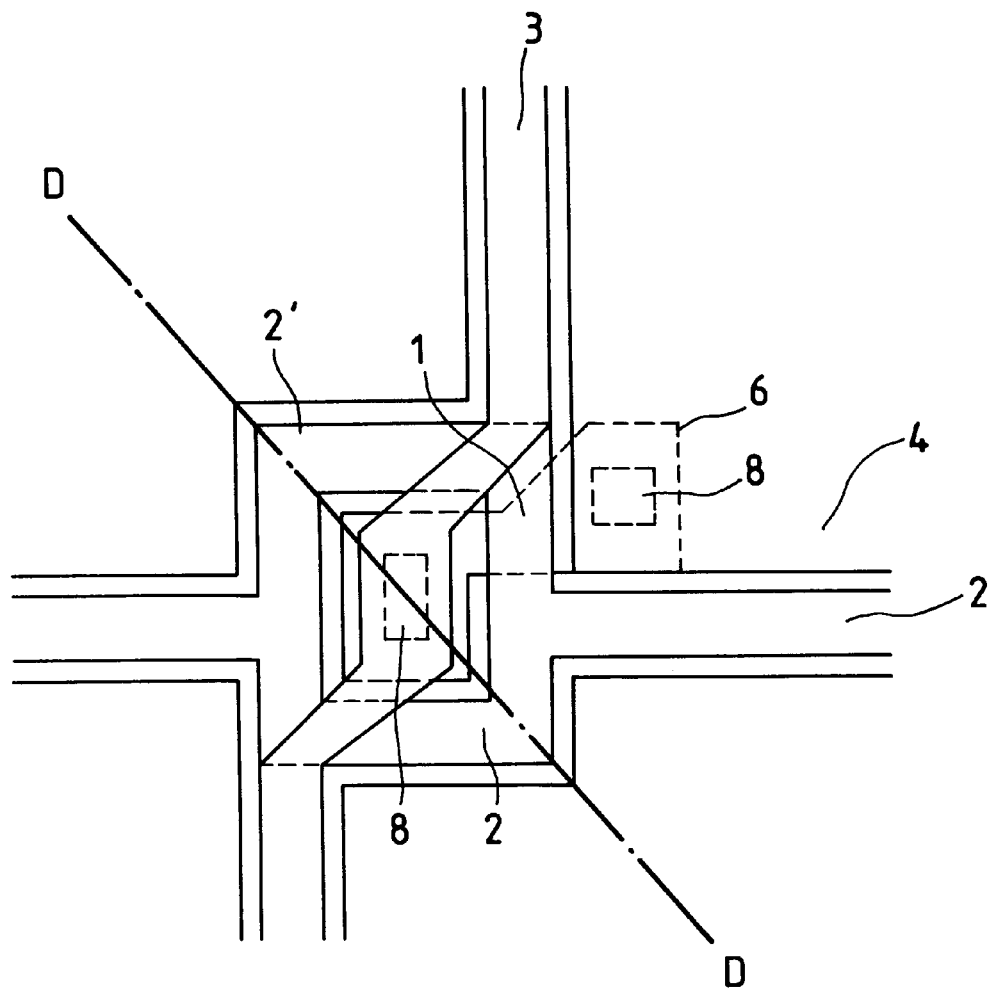
Figure 4B:
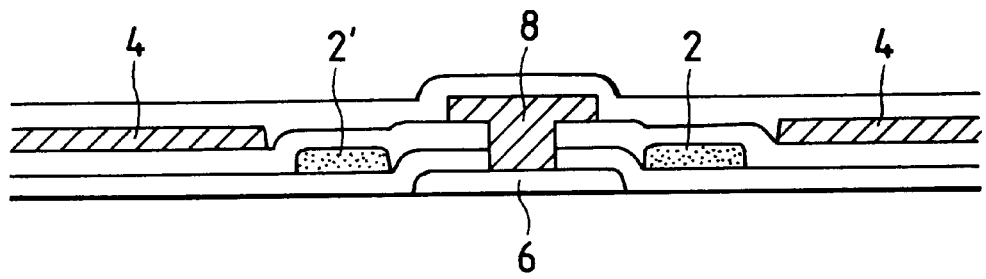

FIGS. 4A and 4B show a second embodiment of the present invention. Numerals used therein are identical to those in FIG. 1. FIG. 4A shows a schematic plan view and FIG. 4B shows a D–D' sectional view of FIG. 4A.

The present embodiment is directed to a color display device. In the color display, red (R), green (G) and blue (B) filters are assigned to each pixel so that a color is displayed by a combination of three colors as a unit. Accordingly, it is desirable that the three pixels in a unit are located closely to each other.

Figure 5:
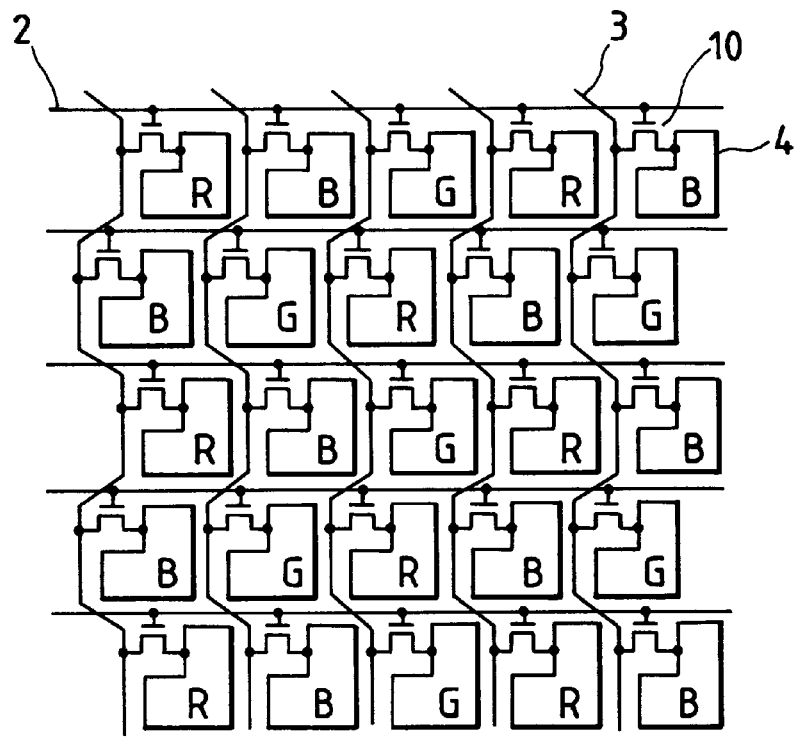

An example of such an arrangement of pixels is shown in FIG. 5. As shown in FIG. 5, in the color display, a sufficient display property may not be attained if R (or G or B) pixels are arranged in line. Accordingly, it is desirable to offset the pixel pitch between the adjacent upper and lower scan lines. By so arranging, the three pixels (R, G and B) in one unit can be readily arranged closely to each other. Accordingly, an offset pattern of the matrix pattern which is commonly used in a monochromatic display is used.

In the present embodiment, the ring-shaped structure of the gate electrode wiring of the present invention is combined with the pixel arrangement in the color display in an efficient manner.

The present embodiment basically differs from the Embodiment 1 in that the pitch of the pixel electrode formed to correspond to the adjacent scan lines 2 is offset, and the scan lines 2 are bent because the source electrodes 7 of the TFT's are shifted downward.

In the present embodiment, like in the Embodiment 1, the periphery of the source electrode 7 is a conductive layer comprising the wiring 2', the gate electrode 1 and the scan line 2 so that the step is relieved as shown in FIG. 4B and the disturbance of the orientation is significantly improved. Further, the break of the conductive layer in the gate electrode 1 or the scan line 2, or at the junction of the gate electrode 1 and the scan line 2 is prevented.

In the present embodiment, like in the Embodiment 1, the wiring area is of ring shape so that the break of the line due to a defect in patterning is prevented.

Further, the resistance of the scan line 2 is reduced as it is in the Embodiment 1 so that the color display of a higher density and a higher fineness is attained.

(Embodiment 3)

Figure 6:
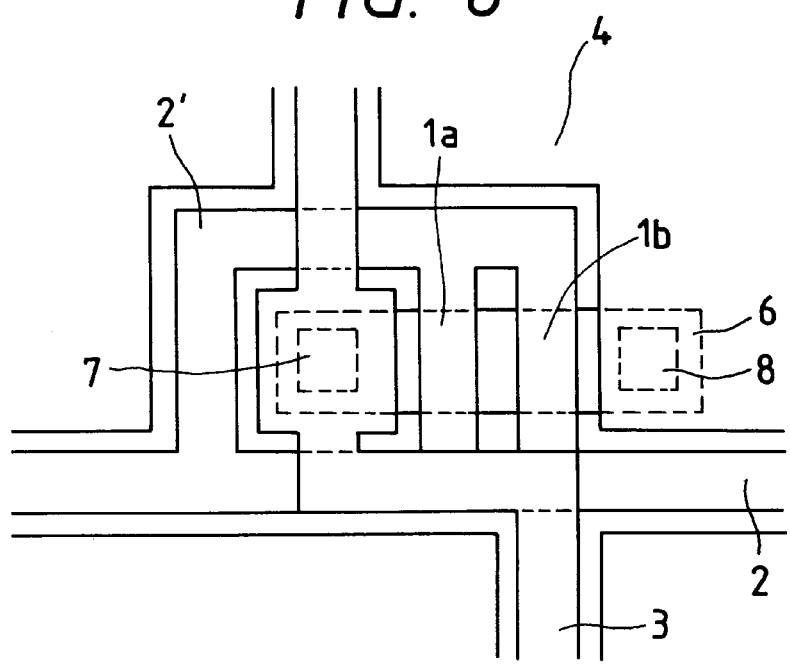

FIG. 6 shows a third embodiment of the present invention. Numerals used therein are identical to those in FIGS. 1 and 2A to 2C.

In the present embodiment, two gate electrodes 1a and 1b are provided in each TFT.

In the present embodiment, like in the Embodiment 2, the pixel electrodes corresponding to the adjacent scan lines are offset. A portion of the signal line 3 is overlapped with a portion of the scan line 2.

The wiring area of the present embodiment also has a ring-shaped structure comprising the scan line 2, the wiring area 2' and the gate electrodes 1a and 1b.

In the present embodiment, since two gate electrodes 1a and 1b are provided, the reduction of the yield due to a defect in patterning the wiring is further prevented.

Further, since a plurality of gate electrodes are provided, a leakage current of the TFT which affects to a tonality characteristic of the display device can be reduced and a high tone display is attained.

The gate electrodes are not limited to two as shown in the present embodiment but three or more gate electrodes may be provided.

Figure 18:
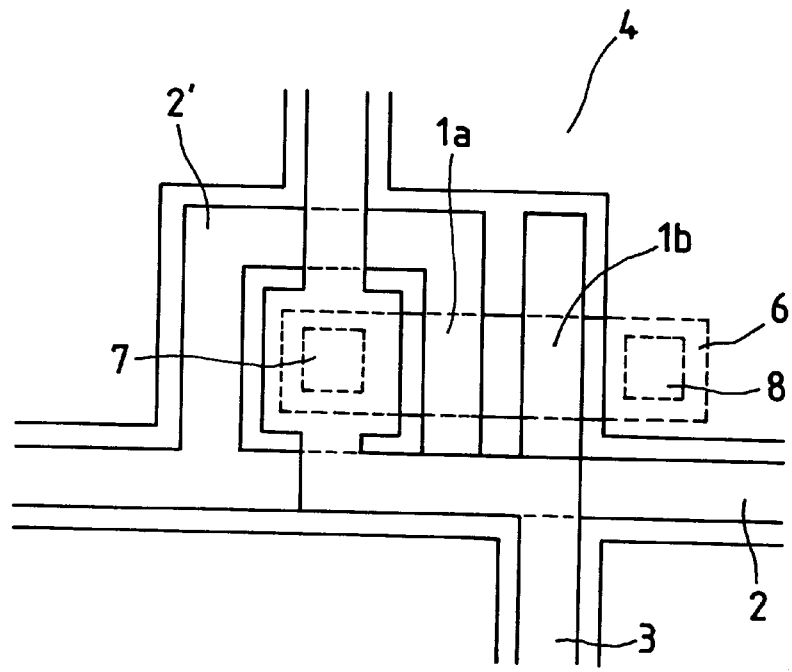

While both of the gate electrodes are connected to the scan line 2 and the wiring 2' in the present embodiment, one of them, for example, the gate electrode 1a may be connected to the scan line 2 and the wiring 2' and the gate electrode 2a may be connected to one of the scan line 2 and the wiring 2' (see FIG. 18). In this case, again, a high tone display is attained.

Figure 19:
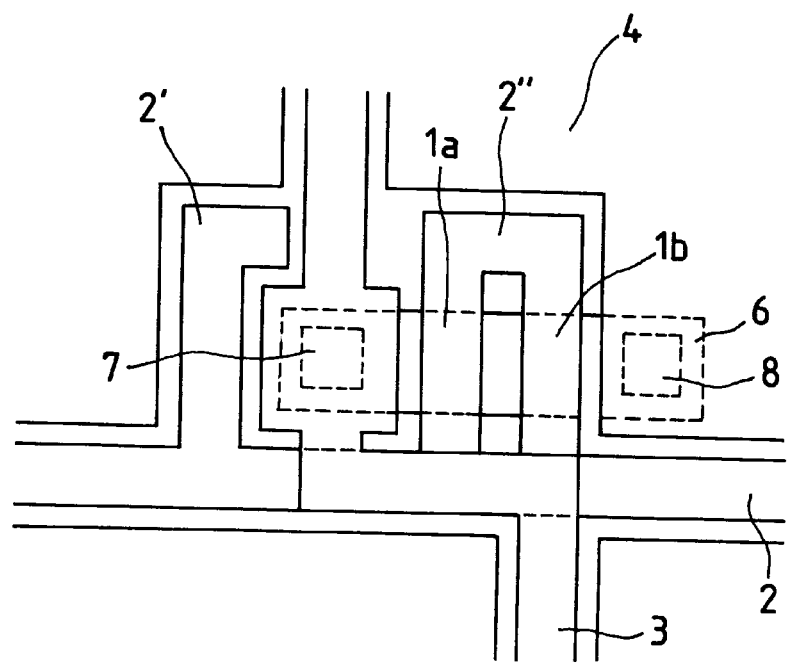

As shown in FIG. 19, a contact of the signal line 3 and the source electrode 7 may be located outside of the ring-shaped gate comprising the gate electrodes 1a and 1b, the scan line 2 and the wiring 2".

In the embodiment shown in FIG. 6, the ring-shaped wiring area is formed to surround the contact of the source electrode 7 and the signal line 3, and in the embodiment shown in FIG. 19, the contact is arranged outside of the ring-shaped wiring area.

The reduction of the yield due to the defect in patterning can also be reduced in the present embodiment.

As described above, since two (or more) gate electrodes are formed between the source and the drain to turn on and off the TFT, the turn-on and the turn-off of the TFT are assured by the provision of the plurality of gate electrodes even if a factor to generate a leakage current such as a crystal defect in the semiconductor layer of the TFT is present. Even if a crystal defect which causes the leakage current is present, at least one gate electrode can attain the required turn-off so that the leakage current in the entire device can be suppressed to a very low level.

Consequently, a defect in display (a black dot or a white dot) is reduced, the yield is increased and a high contrast image display is attained.

(Embodiment 4)

Figure 7A:
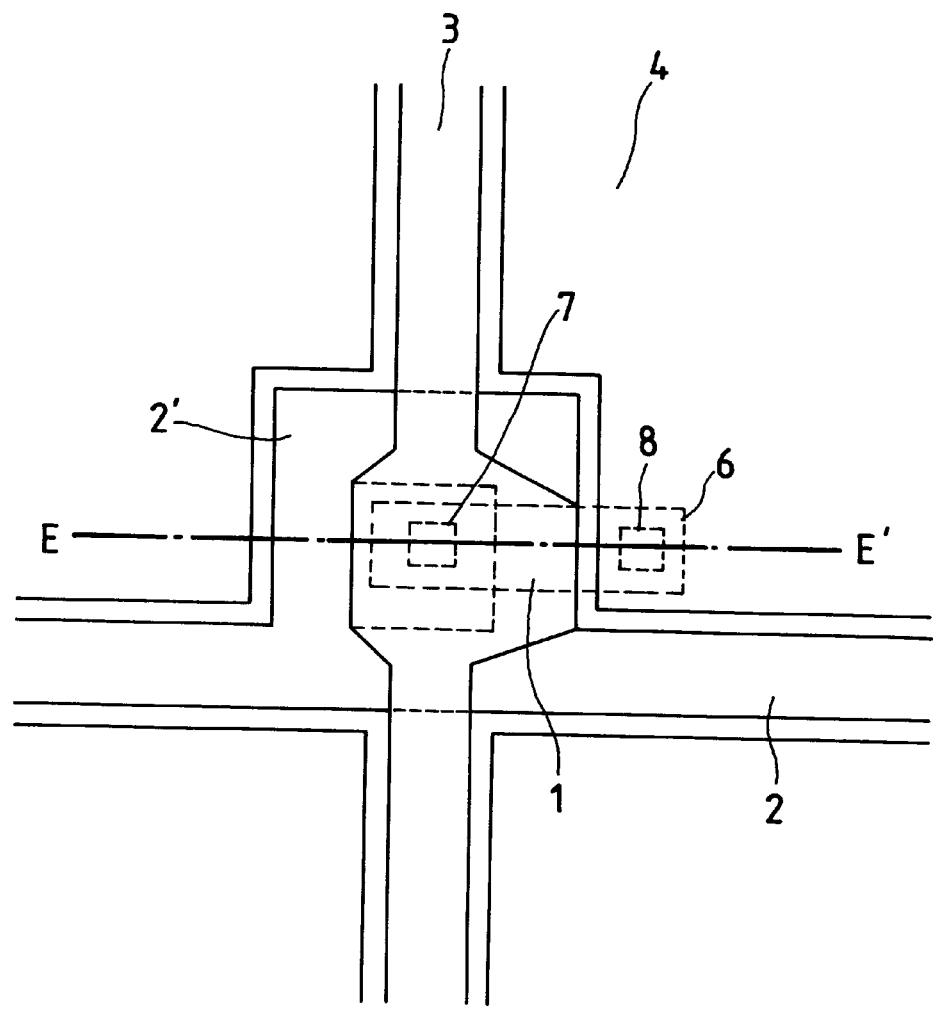
Figure 7B:
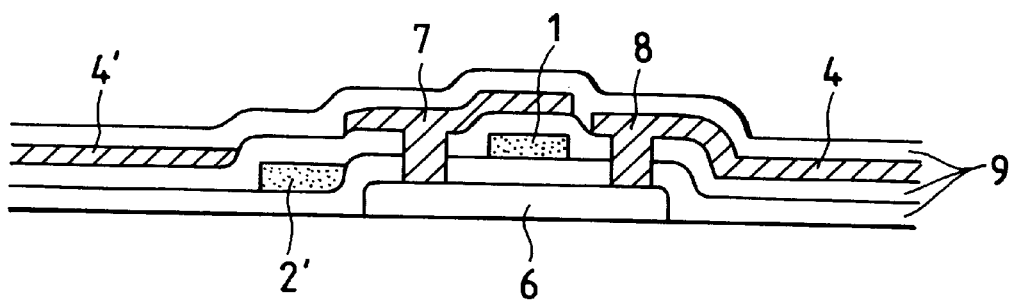

FIGS. 7A and 7B show a fourth embodiment of the present invention. FIG. 7A shows a schematic plan view and FIG. 7B shows a schematic E–E' sectional view of FIG. 7A. As shown in FIGS. 7A and 7B, the present embodiment is essentially identical to the Embodiment 1 except that it is constructed to prevent a light from entering into the underlying semiconductor layer by expanding the signal line 3 over the semiconductor area. Thus, the leakage current of the TFT semiconductor is reduced and a high contrast display is attained. The gate electrode 1 and the signal line 3 are partially overlapped as shown in FIG. 7A.

(Embodiment 5)

Figure 8:
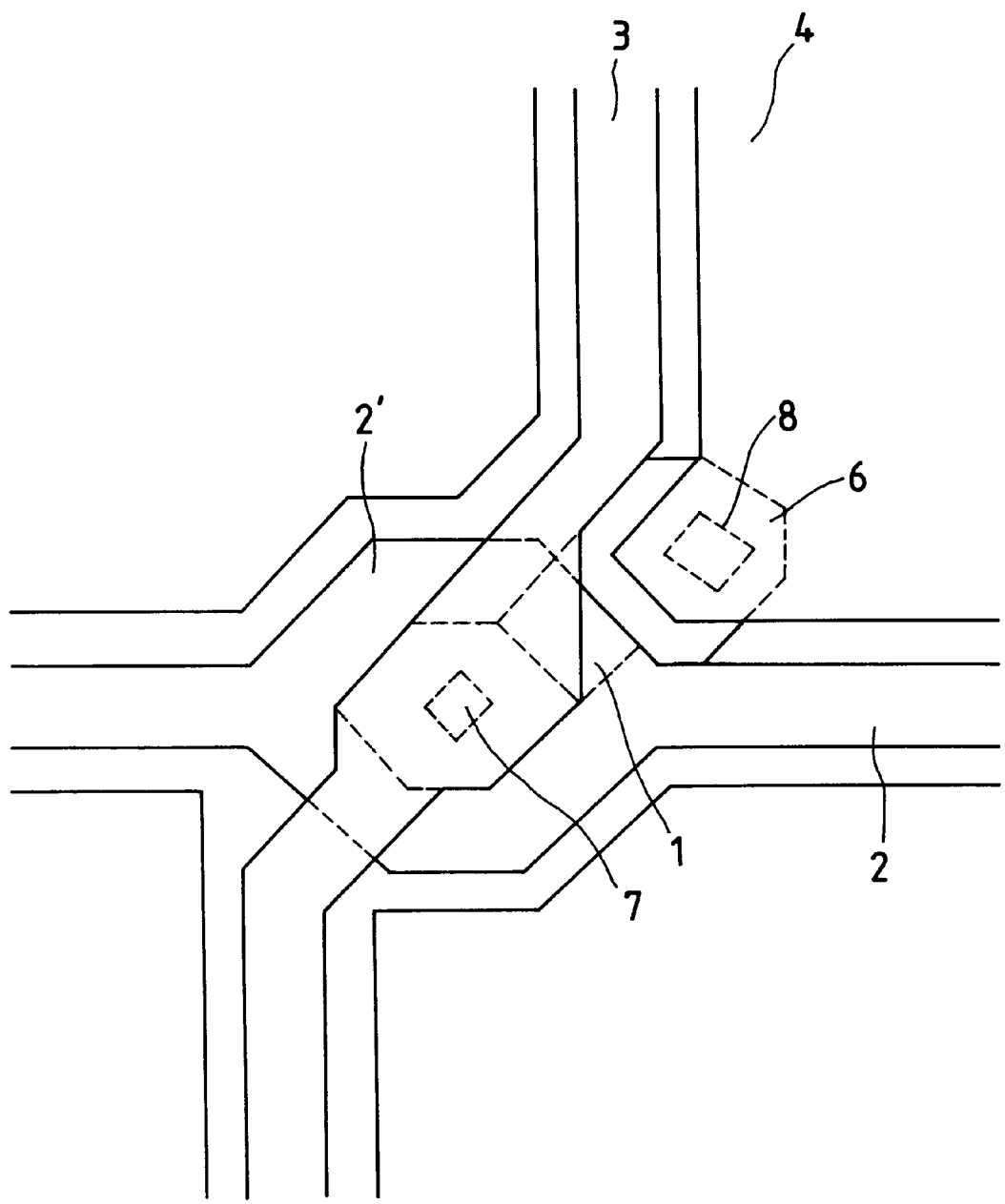

FIG. 8 shows a schematic plan view for illustrating a fifth embodiment of the present invention. The present embodiment is a modification of the Embodiment 2, and the ring-shaped structure of the wiring area comprising the scan line 2, the wiring area 2' and the gate electrode 1 is symmetric to each pixel so that a step created by the formation of the layers is further flattened and the yield is improved. Further, since an aperture ratio is increased, a brighter display is attained and a display property is improved. Further, the resistance of the scan line is reduced as it is in the previous embodiments and a desired scan pulse may be applied.

As shown in FIG. 8, the step is high in the areas shown by α and β or the vicinity thereof. Thus, rubbing may be made in a direction 100 or the opposite direction so that an effective step width is only the area a and the area of a factor of the reduction of contrast caused by a white dot can be reduced and a display device of a higher aperture ratio can be provided.

(Embodiment 6)

Figure 9:
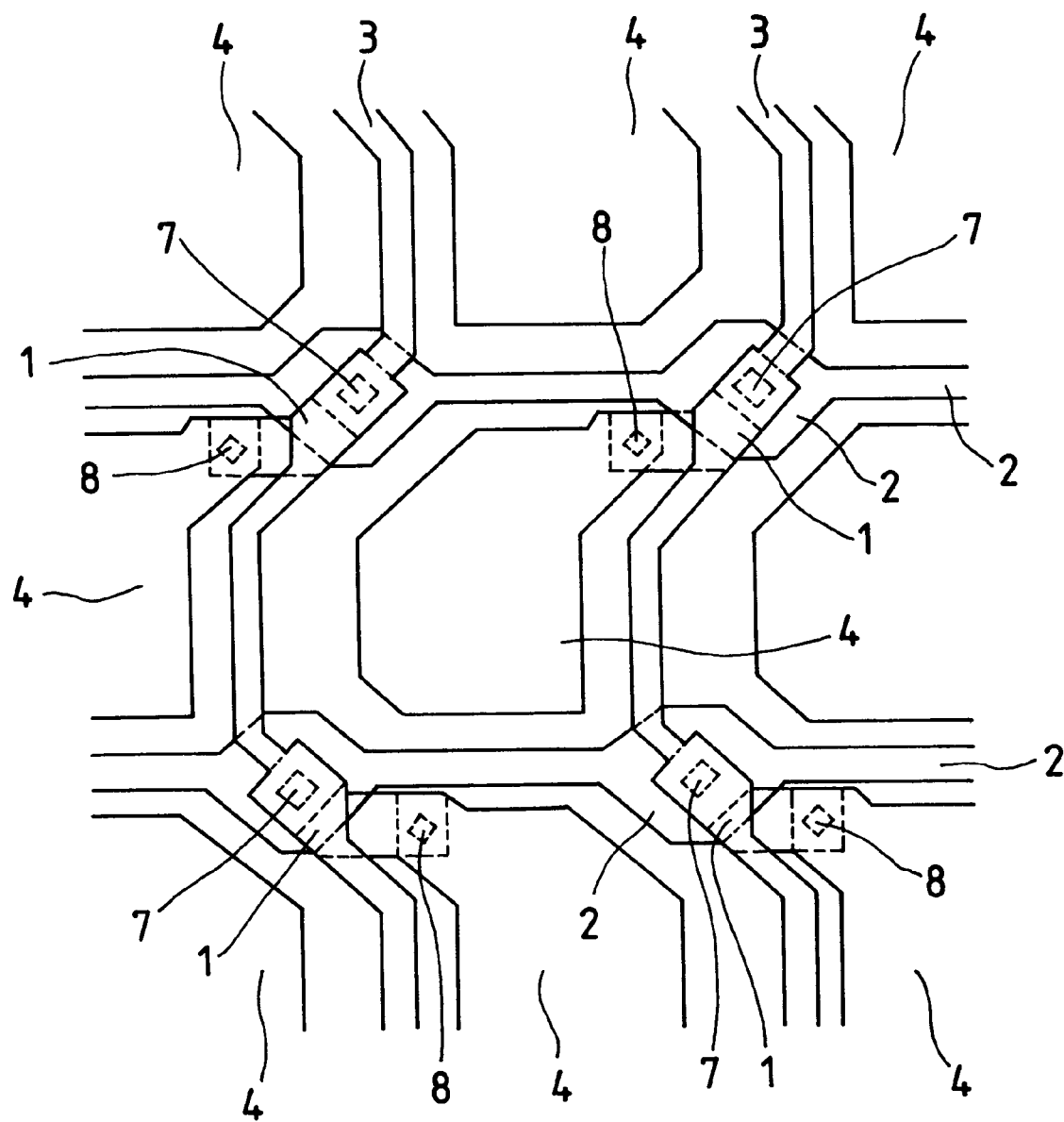

FIG. 9 shows a schematic plan view for illustrating a sixth embodiment of the present invention. In the present embodiment, like in the Embodiment 2, the pixel electrodes are alternately arranged for each line to the signal line. Further, the signal line 3 and the gate electrode 1 are partially overlapped to prevent the leakage current of the TFT. By this arrangement, the aperture ratio is increased and a brighter display is attained. Further, an arrangement in which the R, G and B pixels are arranged to form apexes of a triangle (delta arrangement) and the R, G and B colors are arranged at pitch of 1.5 pixels can also attain a high aperture ratio.

In the periphery of the TFT, the required layers are arranged in overlapped or crossed manner and a step is created in the section as shown in FIG. 2B as described before.

In the pixel corner 61 shown in FIG. 2A, since it is sandwiched by orthogonal signal lines and has a step, there easily occurs a variation in the orientation property and this may be a factor to reduce the yield of the liquid crystal display device.

A wiring structure which improves the orientation property of the orientation control film is now explained.

(Embodiment 7)

Figure 10A:
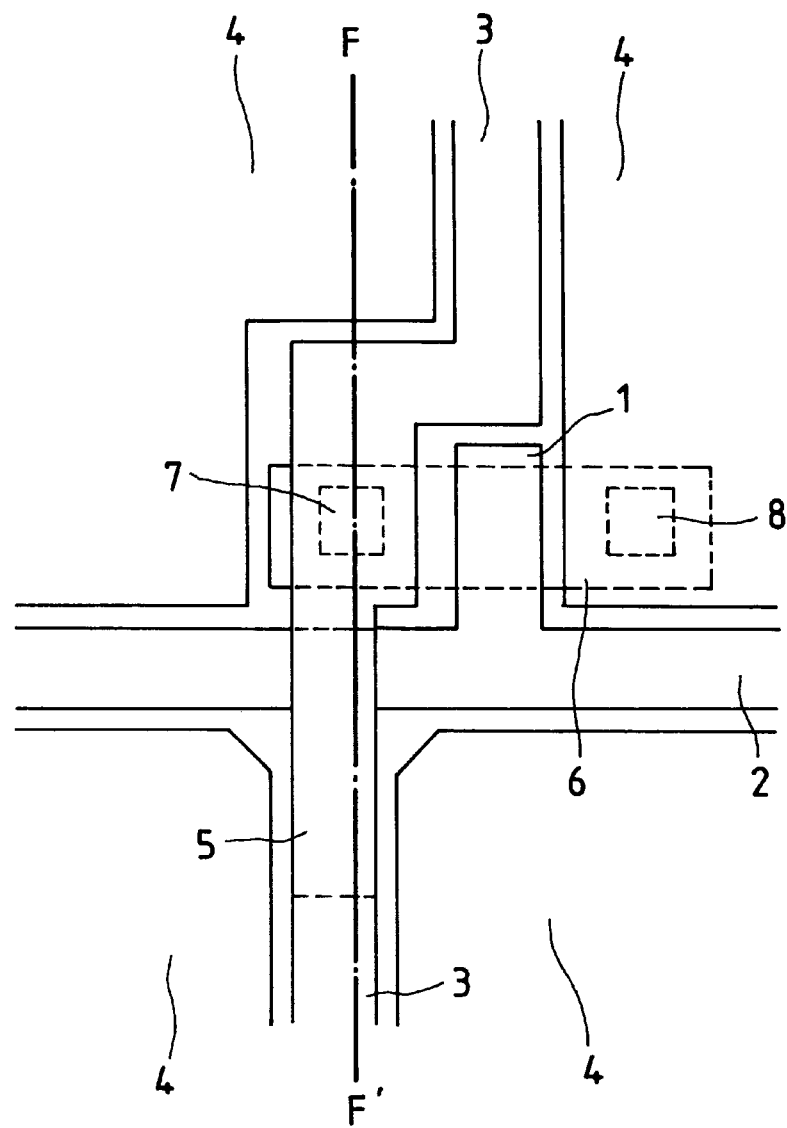
Figure 10B:
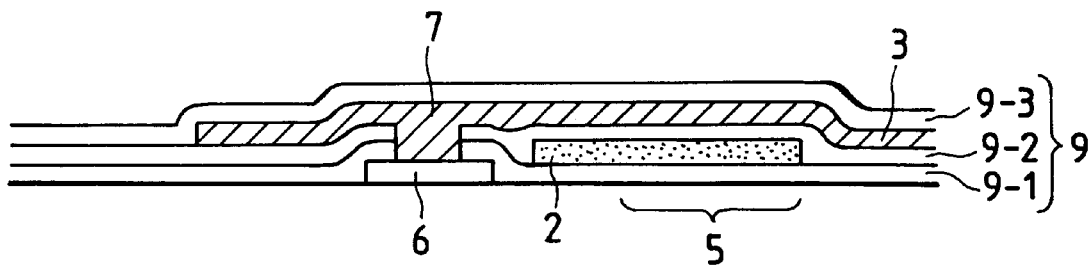

FIGS. 10A and 10B show an embodiment of the present invention. Numeral 1 denotes a gate electrode, numeral 2 denotes a scan line, numeral 3 denotes a signal line, numeral 4 denotes a pixel electrode, numeral 5 denotes a wiring area, numeral 6 denotes a semiconductor layer, numeral 7 denotes a source electrode, numeral 8 denotes a drain electrode, and numeral 9 denotes an interlayer insulating layer. FIG. 10A denotes a schematic plan view and FIG. 10B shows a schematic F–F' sectional view of FIG. 10A. In FIG. 10A, the interlayer insulating layer is omitted.

In the present embodiment, the semiconductor 6 made of amorphous silicon or polycrystalline silicon is formed on a support, the interlayer insulating layer 9-1 is formed on the semiconductor layer 6, a conductive layer is formed on the interlayer insulating layer 9-1, and it is patterned to form a projection corresponding to the scan line 2 and the pixel. One group of projections have the interlayer insulating layer 9-1 formed on the semiconductor layer 6 through the gate insulating layer to form the gate electrode 1. Another group of projections are arranged to correspond to the position of the signal line 3 to be subsequently formed and serve as the wiring area 5. One side of the wiring area 5 is not connected to the gate electrode 1 as opposed to the previous embodiment.

Then, the interlayer insulating layer 9-2 is formed on the scan line 2, the gate electrode 1 and the wiring area 5, and on the areas of the interlayer insulating layer 9-1 in which those are not formed.

Then, the conductive layer is formed and it is patterned to form the source electrode 7 and the drain electrode 8. Then, the conductive layer is formed and it is patterned to form the signal line 3 and the pixel electrode 4 which is made of a transparent conductive layer such as ITO.

Then, the interlayer insulating layer 9-3 is formed and an orientation control film (not shown) such as polyimid or polyamide is formed and an orientation process is conducted to prepare one substrate of the liquid crystal display device.

As seen from FIGS. 10A and 10B, in the present embodiment, the wiring area 5 which is parallel to the gate electrode 1 is formed in the scan line 2 under the signal line 3 and along the signal line 3. Consequently, the step at the crosspoint of the signal line 3 and the scan line 2 is relieved and a local recess is eliminated so that the uniform orientation process to the orientation control film (not shown) formed on the surface of the TFT substrate is attained. By orienting in parallel to the gate electrode 1 and the dummy wiring 5, the orientation property in the periphery of the display signal line is improved.

As shown, by planting off (chamfering) the corners of the pixel electrode 4 to form small sides, the disturbance in the orientation property created at the corners of the pixel electrode 4 is further eliminated.

(Embodiment 8)

Figure 11:
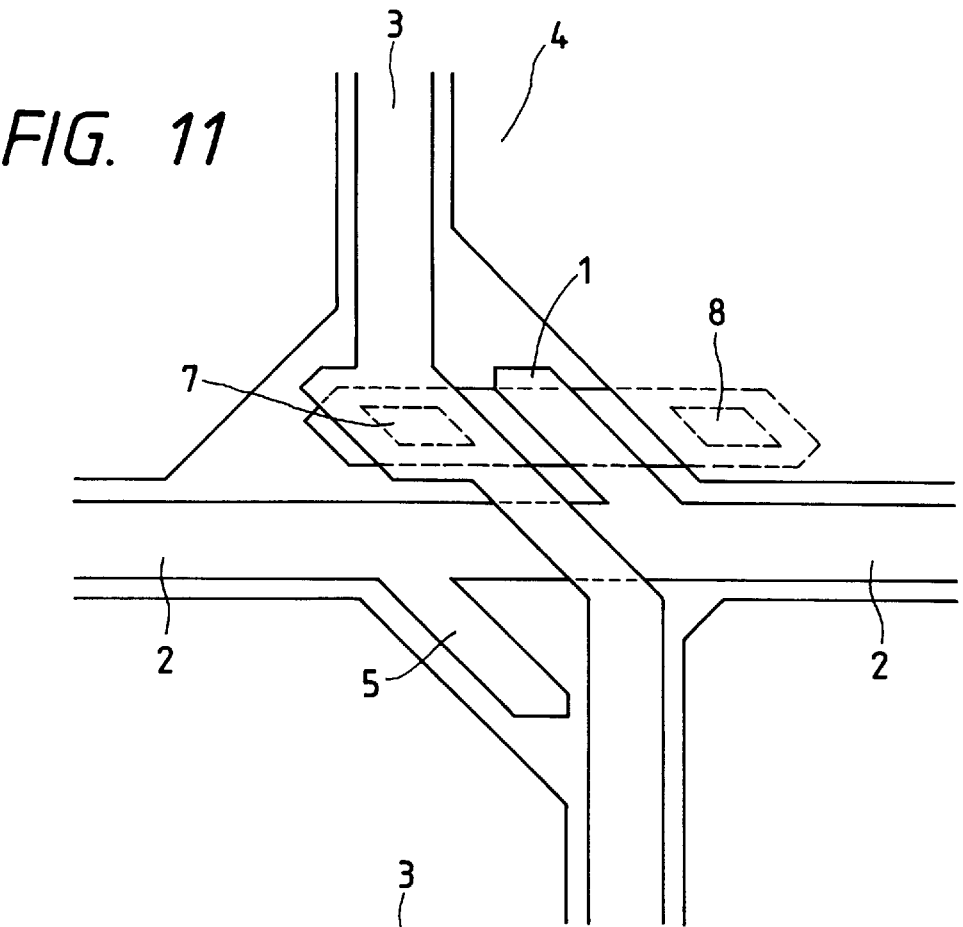

FIG. 11 shows a schematic plan view for illustrating an eighth embodiment of the present invention. The numerals used therein are identical to those of FIGS. 10A and 10B. In the present embodiment, the gate electrode 1 and the wiring 5 are obliquely arranged to the scan line 2 and the pixels are offset parallelly to the scan line 2. In a color display mode, red, blue and green displays are assigned to the respective pixels so that three colors are handled as one unit. Accordingly, it is desirable that the three pixels in the same unit are arranged uniformly closely to each other as explained above. The present embodiment is directed to such color display. By offsetting the pixels, a vertical stripe does not appear prominently in a monochromatic binary display mode and the display characteristic is improved.

In the present embodiment, the orientation process to the orientation control film is conducted in a crossing direction (perpendicular in the present embodiment) to the gate electrode 1 and the wiring area 5 or in parallel thereto so that the orientation in the vicinity of the scan line 2 and the signal line 3 is further improved. In the present embodiment, the scan line 2 extends straight although it is not necessarily straight.

In the present embodiment, the signal line 3 and the wiring area 5 do not overlap as opposed to the Embodiment 7 but the step formed has a peak at the signal line 3 on the source electrode 7 and it is gradually lowered by the scan line 2 and the wiring area 5 so that the step is significantly reduced.

By planting off the corners of the pixel electrode 4 in parallel to the gate electrode 1 or the wiring area 5, the uniformity of the orientation property can be further improved.

(Embodiment 9)

Figure 12:
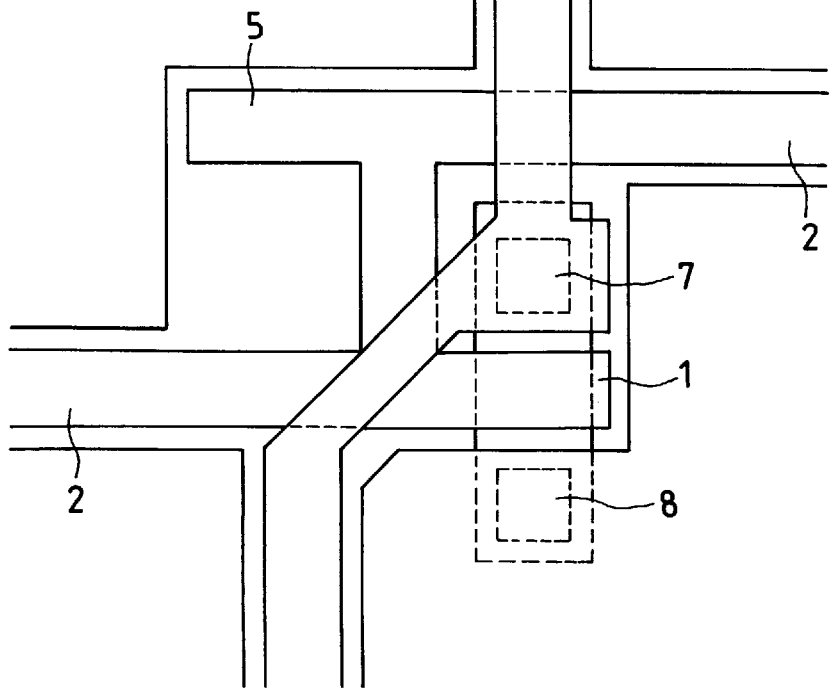

FIG. 12 shows a schematic plan view for illustrating a ninth embodiment of the present invention. In the present embodiment, the pixels are offset along the row and the column, respectively so that not only a vertical stripe but also a horizontal stripe do not appear prominently. In FIG. 12, the length of the wiring area 5 is equal to the length of the gate electrode 1 and the wiring area 5 projects to the opposite direction to the gate electrode 1.

With the above arrangement of the scan line 2, the gate electrode 1 and the wiring area 5, the step is relieved and the uniformity of the orientation property is significantly improved as it is in the Embodiment 8.

(Embodiment 10)

Figure 13:
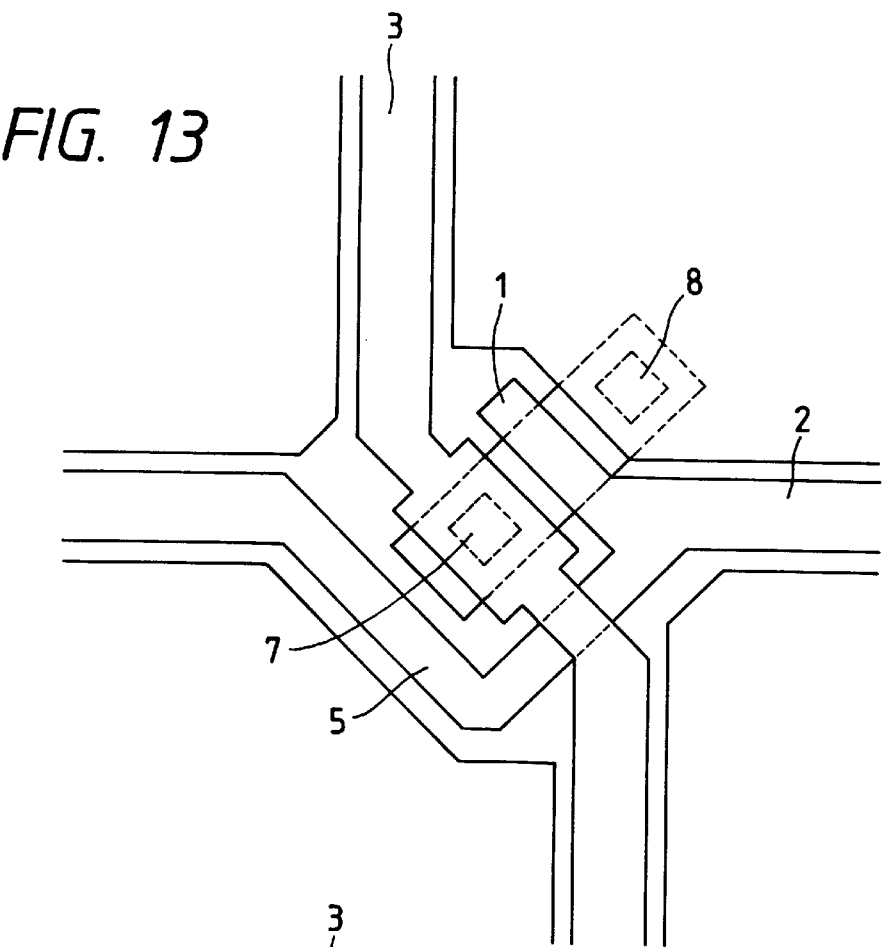

FIG. 13 shows a schematic plan view for illustrating a tenth embodiment of the present invention. In the present embodiment, the wiring area 5 is used as a part of the scan line 2. By arranging the TFT's in the manner shown in the present embodiment, a display with a high aperture ratio, that is a high intensity is attained and heat generation from an illumination light source can be reduced so that baking of the liquid crystal is avoided.

By arranging the gate electrode 1 and the wiring area 5 (the scan line 2 in the present embodiment) to sandwich the drain electrode as shown in FIG. 13, the step can be relieved.

A new wiring area (not shown) may be projected from the scan line 2 as may be required so that it is connected to one end of the gate electrode. In this case, since the wiring area is formed in the ring shape around the drain electrode 7, the reduction of the wiring resistance is attained and the reduction of the yield by the brake is prevented.

(Embodiment 11)

Figure 14:
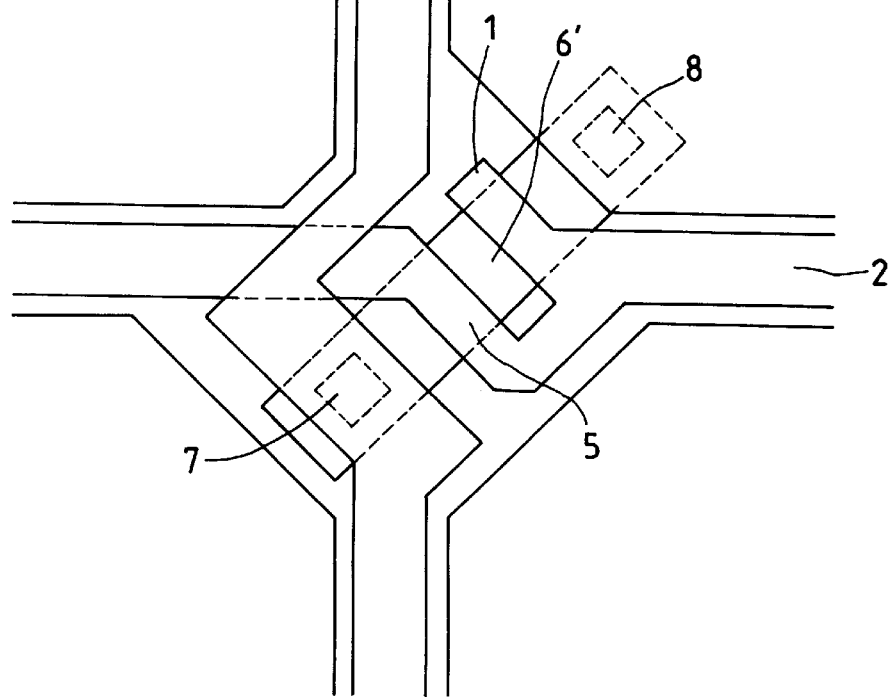

FIG. 14 shows a schematic plan view for illustrating an eleventh embodiment of the present invention. In the present embodiment, the wiring area 5 is used as a second gate electrode. The wiring area 5 also serves as a portion of the scan line 2. In the present embodiment, a semiconductor area 6' between the gate electrode 1 and the wiring area 5 is doped with the same impurity as that of the source and the drain. In the present embodiment, since a plurality of gate electrodes are provided, a leakage current between the source and the drain is significantly improved and a high tone panel is attained. The orientation process is preferably conducted parallelly or normally to the gate electrode 1 and the wiring area 5.

Figure 20:
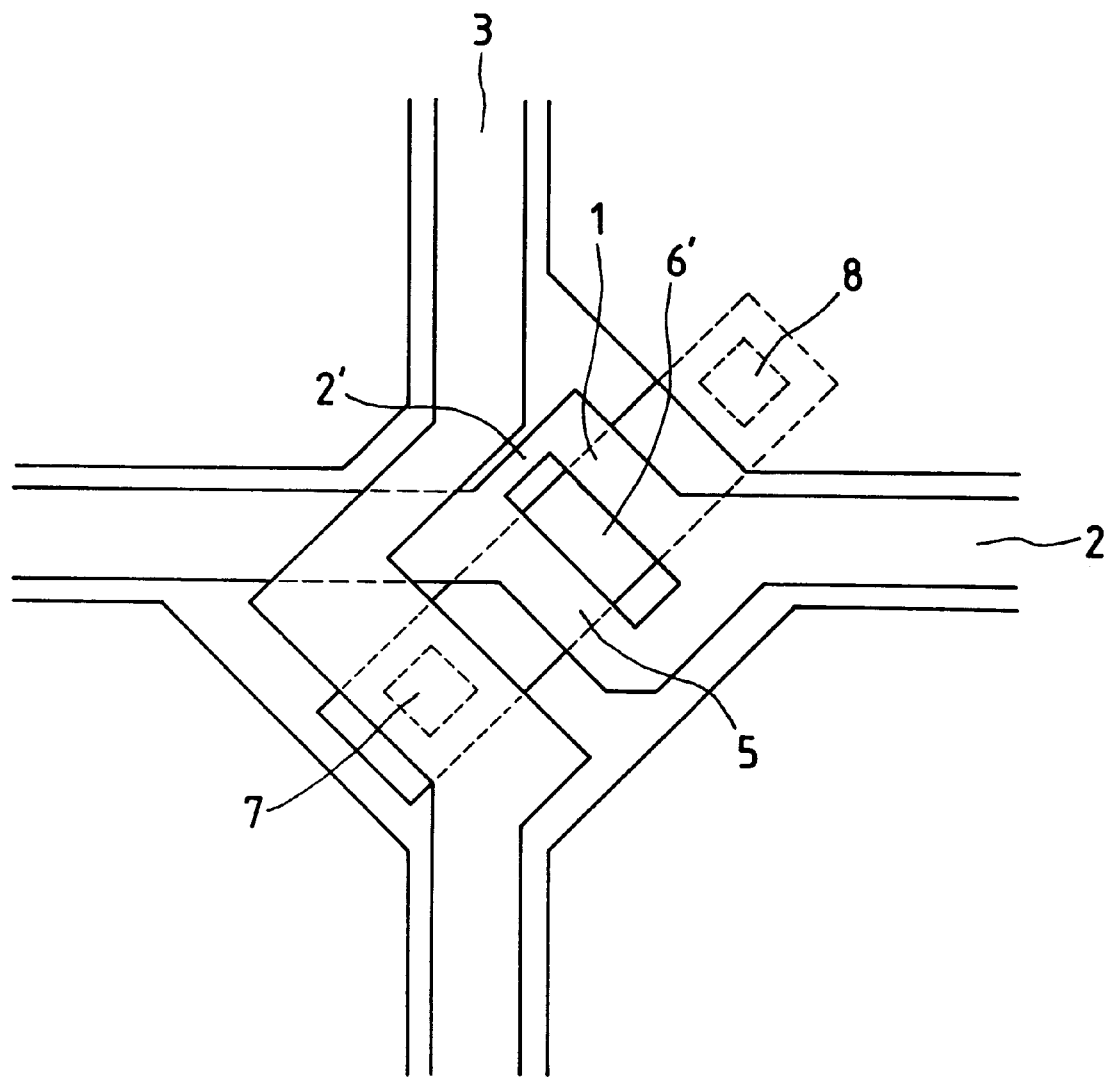
Figure 1:
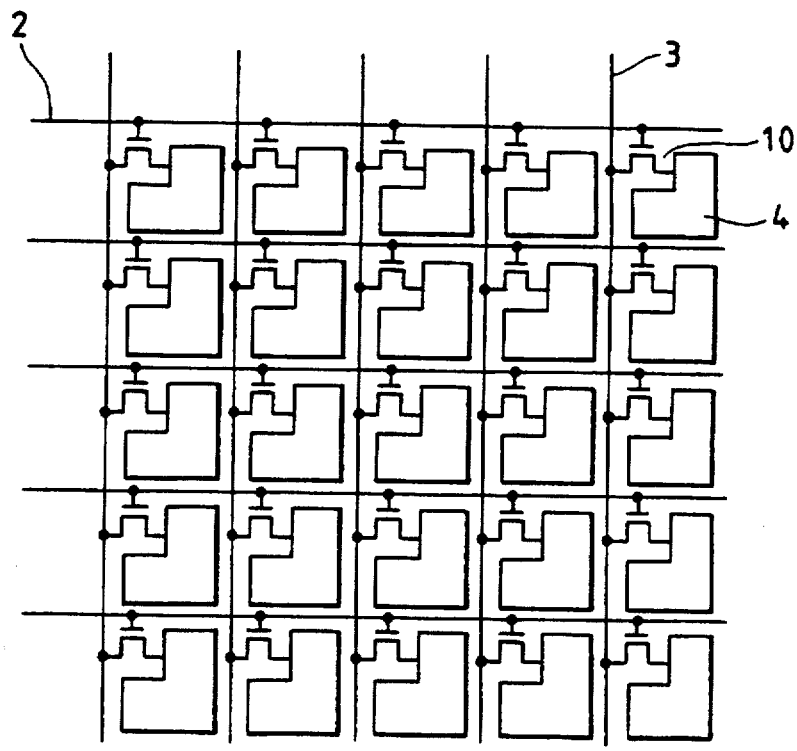
Figure 2A:
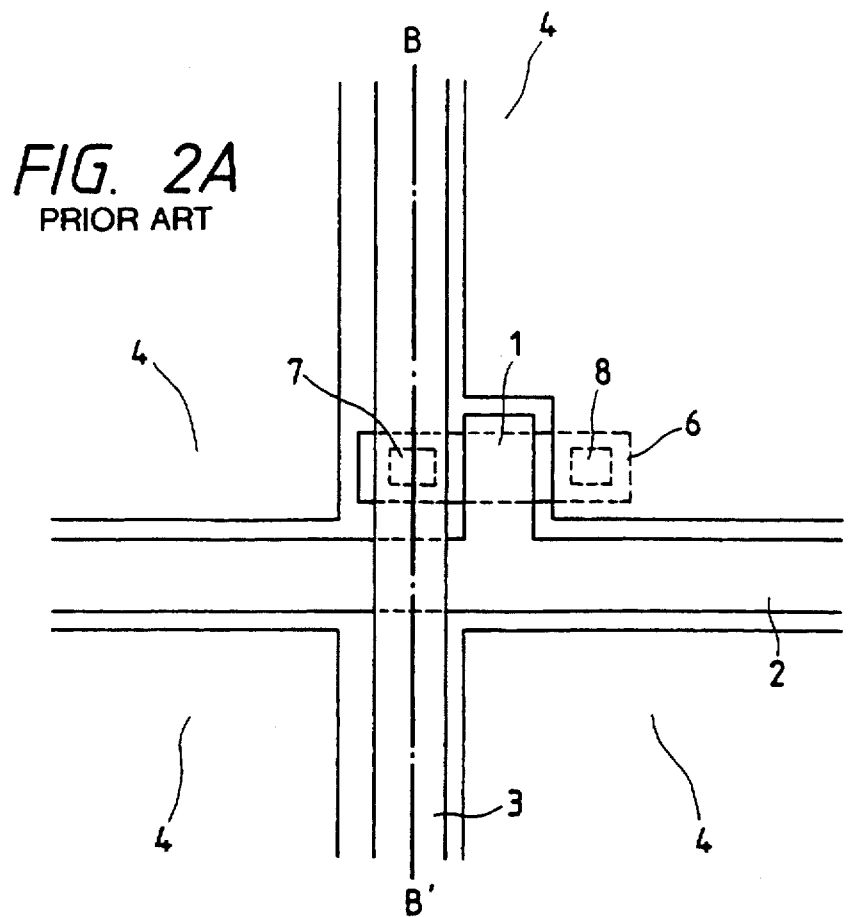
Figure 2B:
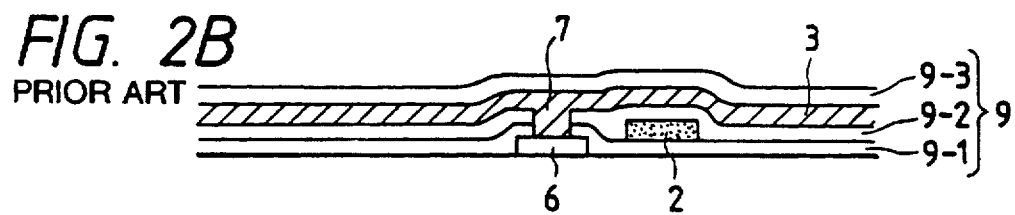
Figure 2C:
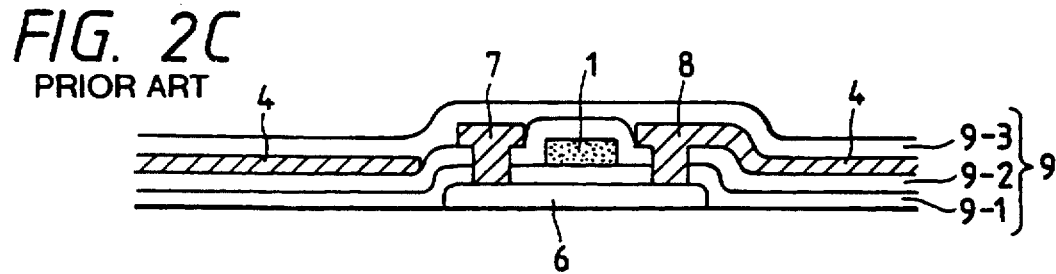

As shown in FIG. 20, the other end corresponding to the gate electrode may be connected to form a ring-shaped structure.

In this case, the number of gates may be further increased.

(Embodiment 12)

FIG. 12 shows a twelfth embodiment of the present invention. In the present embodiment, the signal line 3 is widened over the TFT to reduce a light entering into the TFT. As a result, the leaf of the TFT is reduced and a high contrast display is attained.

In the present embodiment, the step is sufficiently relieved by the arrangement of the wiring area 5 (the scan line 2) and the disturbance of the orientation due to the corners of the pixel electrode is avoided.

Alternatively, a new projection may be formed on the scan line on the side of the semiconductor layer 16 to form a wiring area, or the new wiring area may be connected to an end of the gate electrode to form a wiring area of ring-shaped structure.

By so doing, the wiring resistance can be reduced and the reduction of the yield due to the break is avoided.

(Embodiment 13)

Figure 16:
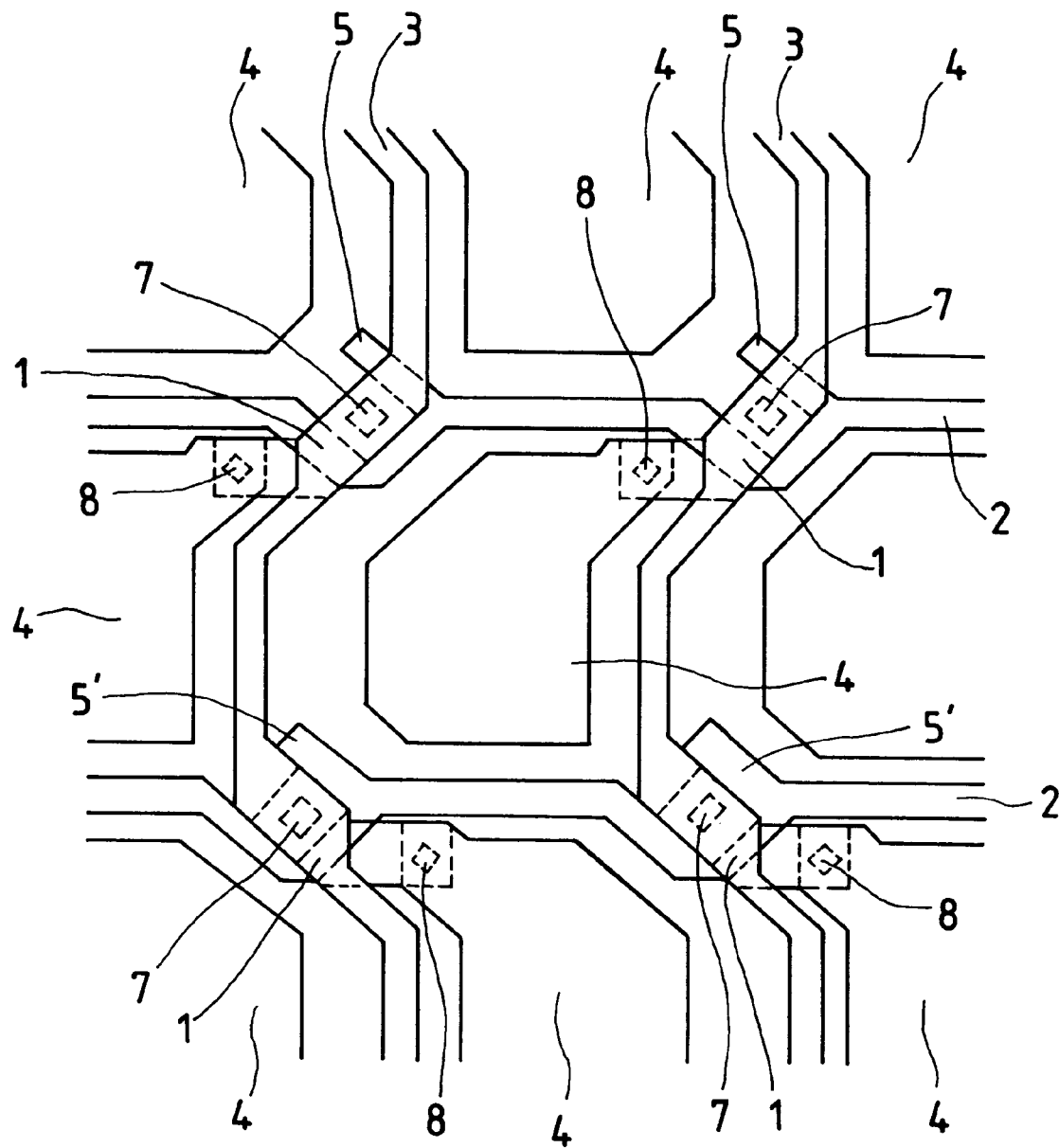

FIG. 16 shows a schematic plan view for illustrating a thirteenth embodiment of the present invention. In the present embodiment, only the pixel electrode 4 which corresponds to the adjacent scan line 2 is offset. A relation between the wiring area and the gate electrode is explained.

In the present embodiment, the gate electrode 1 of the TFT connected to one scan line 2 is arranged in parallel to the wiring area 5 connected to the scan line 2 and the gate electrode 1' connected to the scan line 2 of the next line which is adjacent to the scan line 2 is arranged to a crossing direction (perpendicularly in the present embodiment) to the wiring area 5'. By so arranging, the pixel electrodes connected to the same signal line can be arranged left and right in alternate rows. As a result, the respective colors R, G and B can be arranged at a pitch of 1.5 pixels in alternate rows. Consequently, the resolution is improved and the display property is improved.

In the present embodiment, a portion of the scan line 2 is used as the gate electrode. Where the other ends of the wiring areas 5 and 5' are connected to the scan line 2, it corresponds to the structure shown in the Embodiment 6.

In accordance with the present invention, the defect in the wiring of the gate electrode and the scan electrode is suppressed, the manufacturing yield is improved and a high reliability of the display device is attained.

In accordance with the present invention, since the step on the surface of the TFT substrate is relieved, the break of the wiring is suppressed to a very low level and the orientation property of the orientation control film is improved so that a more preferable orientation state of the liquid crystal is attained and the display device with an improved display property is provided.

The wiring areas formed in the above embodiments need not be of the same length or the same width and they may be varied within range in which the advantage of the present invention is offered.

The present invention is not limited to the above embodiments and it may be changed or modified within the spirit and scope of the present invention.

What is claimed is:

1. A TFT substrate, comprising:
   a support, a plurality of transistors each having a semiconductor layer, at least two main electrodes and a gate electrode;
   pixel electrodes provided one for each of said transistors and connected to one of said main electrodes;
   signal lines converted to the other of said main electrodes;
   scan lines connected to said gate electrodes; and
   wiring area conductors connected to said scan lines, wherein
   one end of each of said wiring area conductors is connected to said gate electrode, and said wiring area conductor, said gate electrode and said scan line form a ring-shaped structure around the other main electrode of said transistor.

2. A TFT substrate according to claim 1, wherein said wiring area conductors and said gate electrodes are parallel to each other.

3. A TFT substrate according to claim 1, wherein said wiring area conductors are arranged to cross said gate electrodes.

4. A TFT substrate according to claim 3, wherein the wiring area conductors cross the gate electrodes at a crossing angle of 90 degrees.

5. A TFT substrate according to any of claims 1–3, wherein a plurality of gate electrodes are provided for each of said transistors.

6. A TFT substrate according to any of claims 1–3, wherein said gate electrodes are portions of said scan lines.

7. A TFT substrate according to any of claims 1–3, wherein said wiring area conductors are portions of said scan lines and said scan lines are bent between said pixel electrodes.

8. A TFT substrate according to any of claims 1–3, wherein said pixel electrodes have sides which are parallel to said wiring area conductors or said gate electrode.

9. A TFT substrate according to any of claims 1–3, wherein said pixel electrodes are chamfered.

10. A TFT substrate according to any of claims 1–4, wherein said pixel electrodes have sides which extend to cross said wiring area conductors or said gate electrodes.

11. A TFT substrate according to claim 10, wherein the wiring area conductors cross the gate electrodes at a crossing angle of 90 degrees.

12. A TFT substrate according to any of claims 2–4, further comprising an orientation film on the surface of said TFT substrate.

13. TFT substrate according to claim 12 wherein said orientation film is made of an inorganic insulating material or a high molecular material.

14. A TFT substrate according to claim 13, wherein said high molecule material is polyamide or polyimide.

15. A TFT substrate according to any of claims 1–3, wherein said semiconductor layer is made of polycrystalline silicon, amorphous silicon or single crystal silicon.

16. A TFT substrate according to any of claims 1–3, wherein said gate electrodes are formed on said semiconductor layer through an insulating layer.

17. A TFT substrate according to any of claims 1–3, wherein the length and the width of said wiring area conductor are substantially equal to the length and the width of said gate electrode.

18. A TFT substrate for an active matrix type liquid crystal display device holding liquid crystal between a common substrate and said TFT substrate, said TFT substrate comprising:

a plurality of pixel electrodes;

transistors provided one for each of said pixel electrodes;

signal lines connected to first main electrodes of said transistors;

said pixel electrodes being connected to second main electrodes of said transistors; and scan lines connected to control electrodes of said transistors, wherein said scan lines have a ring-shaped structure to surround connecting areas of said main electrodes and said signal lines.

19. A liquid crystal display device, comprising:

a TFT substrate including a support, a plurality of transistors each having a semiconductor layer, at least two main electrodes and a gate electrode, pixel electrodes provided one for each of said transistors and connected to one of said main electrodes, signal lines connected to the other of said main electrodes, scan lines connected to said gate electrodes, and wiring area conductors connected to said scan lines;

an opposing substrate including a second support and a common electrode formed on said second support; and liquid crystal arranged between said TFT substrate and said opposing substrate, wherein one end of each of said wiring area conductors is connected to said gate electrode, and said wiring area, said gate electrode and said scan line form a ring-shaped structure around the other main electrode of said transistor.

20. A liquid crystal display device according to claim 19, wherein said wiring area conductors and said gate electrodes are parallel to each other.

21. A liquid crystal display device according to claim 19, wherein said wiring area conductors are arranged to cross said gate electrodes.

22. A liquid display device according to claim 21, wherein the wiring area conductors cross the gate electrodes at a crossing angle of 90 degrees.

23. A liquid crystal display device according to any of claims 19–21, wherein a plurality of gate electrodes are provided for each of said transistors.

24. A liquid crystal display device according to any of claims 19–21, wherein said gate electrodes are portions of said scan lines.

25. A liquid crystal display device according to any of claims 19–21, wherein said wiring area conductors are portions of said scan lines and said scan lines are bent between said pixel electrodes.

26. A liquid crystal display device according to any of claims 19–21, wherein said pixel electrodes have sides which are parallel to said wiring area conductors or said gate electrodes.

27. A liquid crystal display device according to any of claims 19–21, wherein said pixel electrodes are chamfered.

28. A liquid crystal display device according to any of claims 19–21, wherein said pixel electrodes have sides which extend to cross said wiring area conductors or said gate electrodes.

29. A liquid display device according to claim 28, wherein the wiring area conductors cross the gate electrodes at a crossing angle of 90 degrees.

30. A liquid crystal display device according to any of claims 19–21, further comprising an orientation film on the surface of said TFT substrate.

31. A liquid crystal display device according to claim 30 wherein said orientation film is made of an inorganic insulating material or a high molecule material.

32. A liquid crystal display device according to claim 31, wherein said high molecule material is polyamide or polyimide.

33. A liquid crystal display device according to any of claims 19–21, wherein said semiconductor layer is made of polycrystalline silicon, amorphous silicon or single crystal silicon.

34. A liquid crystal display device according to any of claims 19–21, wherein said gate electrodes are formed on said semiconductor layer through an insulating layer.

35. A liquid crystal display device according to any of claims 19–21, wherein the length and the width of said wiring area conductor are substantially equal to the length and the width of said gate electrode.

36. An active matrix type liquid crystal display device, comprising:

a substrate having a common electrode;

a TFT substrate including a plurality of pixel electrodes, transistors provided one for each of said pixel electrodes, signal lines connected to first main electrodes of said transistors, said pixel electrodes being connected to second main electrodes of said transistors, and scan lines connected to control electrodes of said transistors;

said scan lines having a ring-shaped structure to surround connecting portions of said main electrodes and said signal lines; and liquid crystal held between said substrate and said TFT substrate.

* * * * *

UNITED STATES PATENT AND TRADEMARK OFFICE
CERTIFICATE OF CORRECTION

PATENT NO. : 5,897,182
DATED : April 27, 1999
INVENTOR(S) : Mamoru Miyawaki

It is certified that error appears in the above-identified patent and that said Letters Patent is hereby corrected as shown below:

IN THE DRAWINGS

Figure 1:
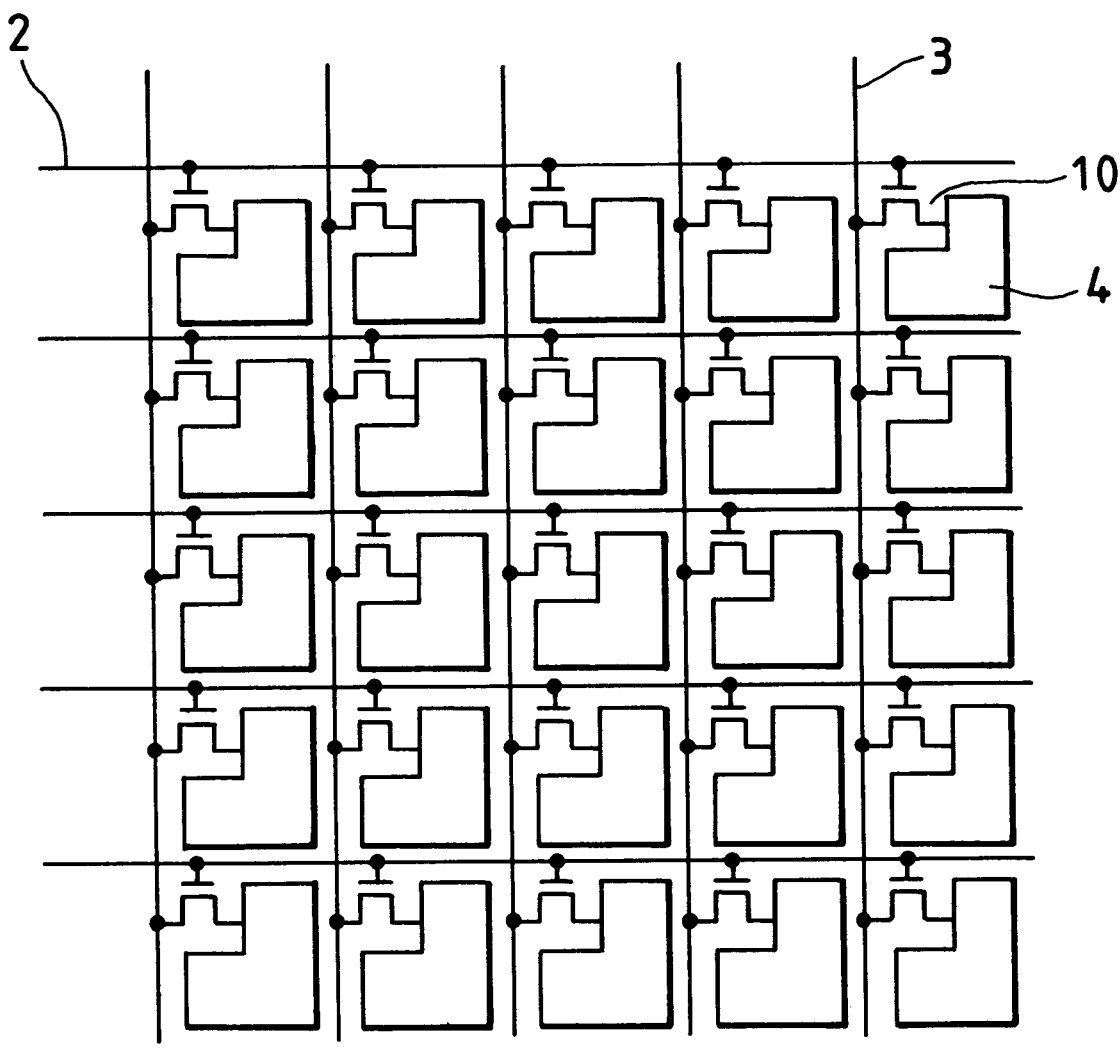
FIG. 1 and FIG. 5 show examples of a TFT substrate of a liquid crystal display device.

Sheet 1, FIG. 1, insert attached Fig. 1, replacing Fig. 1; and
Sheet 2, FIG. 2A-2C, insert attached Figs. 2A to 2C replacing Figs. 2A to 2C.

COLUMN 1

Line 32, "pixels" should read --pixel--.

COLUMN 4

Line 35, "polyimid," should read --polyimide,--;
Line 39, "polyimid" should read --polyimide--; and
Line 42, "polyimid" should read --polyimide--.

COLUMN 5

Line 50, "to" should be deleted.

COLUMN 6

Line 52, "area a" should read --area $\alpha$--.

UNITED STATES PATENT AND TRADEMARK OFFICE
CERTIFICATE OF CORRECTION

PATENT NO. : 5,897,182
DATED : April 27, 1999
INVENTOR(S) : Mamoru Miyawaki

It is certified that error appears in the above-identified patent and that said Letters Patent is hereby corrected as shown below:

COLUMN 7

Line 51, "polyimid" should read --polyimide--; and
Line 61, "planting" should read --plaiting--.

COLUMN 8

Line 34, "planting" should read --plaiting--; and
Line 43, "respectively" should read --respectively,--.

COLUMN 9

Figure 15:
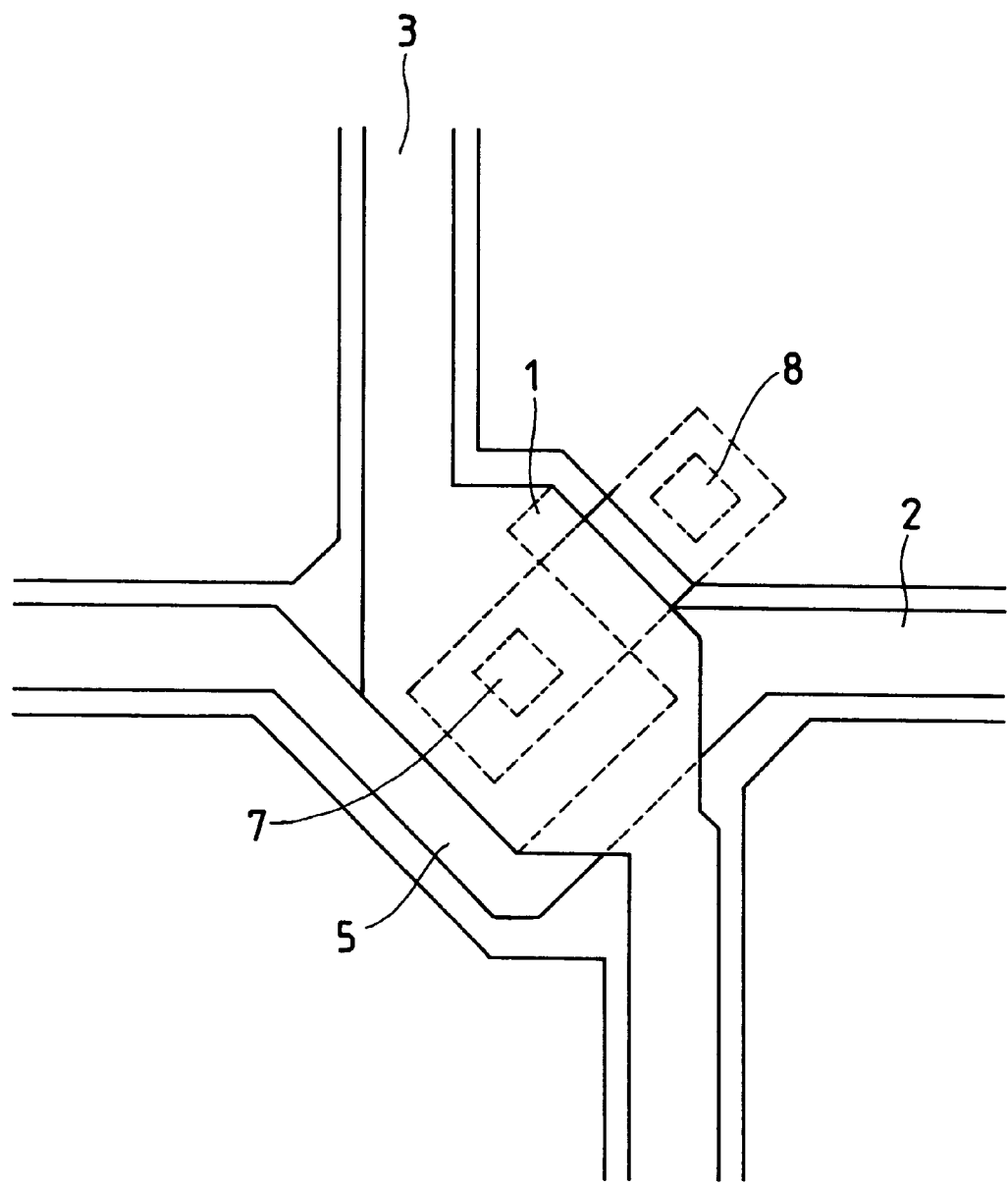

Line 26, "FIG. 12" should read --FIG. 15--.

COLUMN 10

Line 23, "converted" should read --connected--;
Line 56, "claims 1-4," should read --claims 1-3,--;
Line 62, "claims 2-4," should read --claims 1-3,--; and
Line 65, "claim 12" should read --claim 12,--.

COLUMN 11

Line 2, "molecule" should read --molecular--.

UNITED STATES PATENT AND TRADEMARK OFFICE
CERTIFICATE OF CORRECTION

PATENT NO. : 5,897,182
DATED : April 27, 1999
INVENTOR(S) : Mamoru Miyawaki

It is certified that error appears in the above-identified patent and that said Letters Patent is hereby corrected as shown below:

COLUMN 12

Line 25, "claim 30" should read --claim 30,--.

Signed and Sealed this

Twenty-eighth Day of December, 1999

Attest:

Q. TODD DICKINSON

Attesting Officer    Acting Commissioner of Patents and Trademarks